United States Patent [19]

Oury

[11] E Re. 29,110

[45] Reissued Jan. 11, 1977

[54] BOOM MOUNTED CONVEYING MEANS

[75] Inventor: Robert F. Oury, Elmhurst, Ill.

[73] Assignee: Rotec Industries, Inc., Elmhurst, Ill.

[22] Filed: July 13, 1973

[21] Appl. No.: 380,089

Related U.S. Patent Documents

Reissue of:

[64] Patent No.: 3,598,224
Issued: Aug. 10, 1971
Appl. No.: 778,242
Filed: Nov. 22, 1968

[52] U.S. Cl. ..... 198/314; 198/583; 198/588

[51] Int. Cl.[2] ..... B65G 15/26

[58] Field of Search ..... 198/65, 92, 233

[56] References Cited

UNITED STATES PATENTS

| | | | |
|---|---|---|---|
| 2,721,645 | 10/1955 | Eberle | 198/101 |
| 2,773,608 | 12/1956 | Hunt et al. | 214/14 |
| 2,968,382 | 1/1961 | Oury | 193/16 X |
| 3,003,611 | 10/1961 | Pelzer | 198/88 |
| 3,151,732 | 10/1964 | Oury et al. | 198/92 |
| 3,171,534 | 3/1965 | Oury | 198/84 |
| 3,198,353 | 8/1965 | McDowell | 214/14 |
| 3,203,538 | 8/1965 | Oury | 198/208 |
| 3,228,156 | 1/1966 | Sheehan | 198/139 |
| 3,285,385 | 11/1966 | Langner | 198/9 |
| 3,439,700 | 4/1969 | Preston | 137/615 X |
| 3,687,276 | 8/1972 | Pelletier | 198/233 |
| R26,347 | 2/1968 | Oury | 198/84 |

FOREIGN PATENTS OR APPLICATIONS

| | | | |
|---|---|---|---|
| 626,773 | 3/1963 | Germany | 198/89 |
| 1,123,681 | 8/1968 | United Kingdom | 198/89 |

*Primary Examiner*—Evon C. Blunk
*Assistant Examiner*—Richard K. Thomson
*Attorney, Agent, or Firm*—Allegretti, Newitt, Witcoff & McAndrews

[57] ABSTRACT

Conveying means is mounted on an extensible boom of a wheeled vehicle in such manner that one end of the conveyor system is adapted to receive materials such as concrete or the like from a delivery truck and the other end is adapted to discharge the materials, as through a tremie, into a wall form or the like. The arrangement is such that the boom of the wheeled vehicle can be extended and retracted, inclined and swung from side to side during a continuous materials delivery operation so that the tremie can follow the outline of the wall form for evenly distributing the materials therein. The extension, elevation and wing of the boom can be effected by the operator without interrupting the flow of materials, and the form filling job can therefore be completed in a minimum of time.

20 Claims, 19 Drawing Figures

Inventor:
Robert F. Oury
By Bair, Freeman & Molinare Attys.

Inventor:
Robert F. Oury
By Bair, Freeman & Molinare Atty.

Inventor:
By Robert F. Oury
Bair, Freeman
& Molinare Attys

Inventor:
Robert F. Oury
By Bair, Freeman & Molinare Attys.

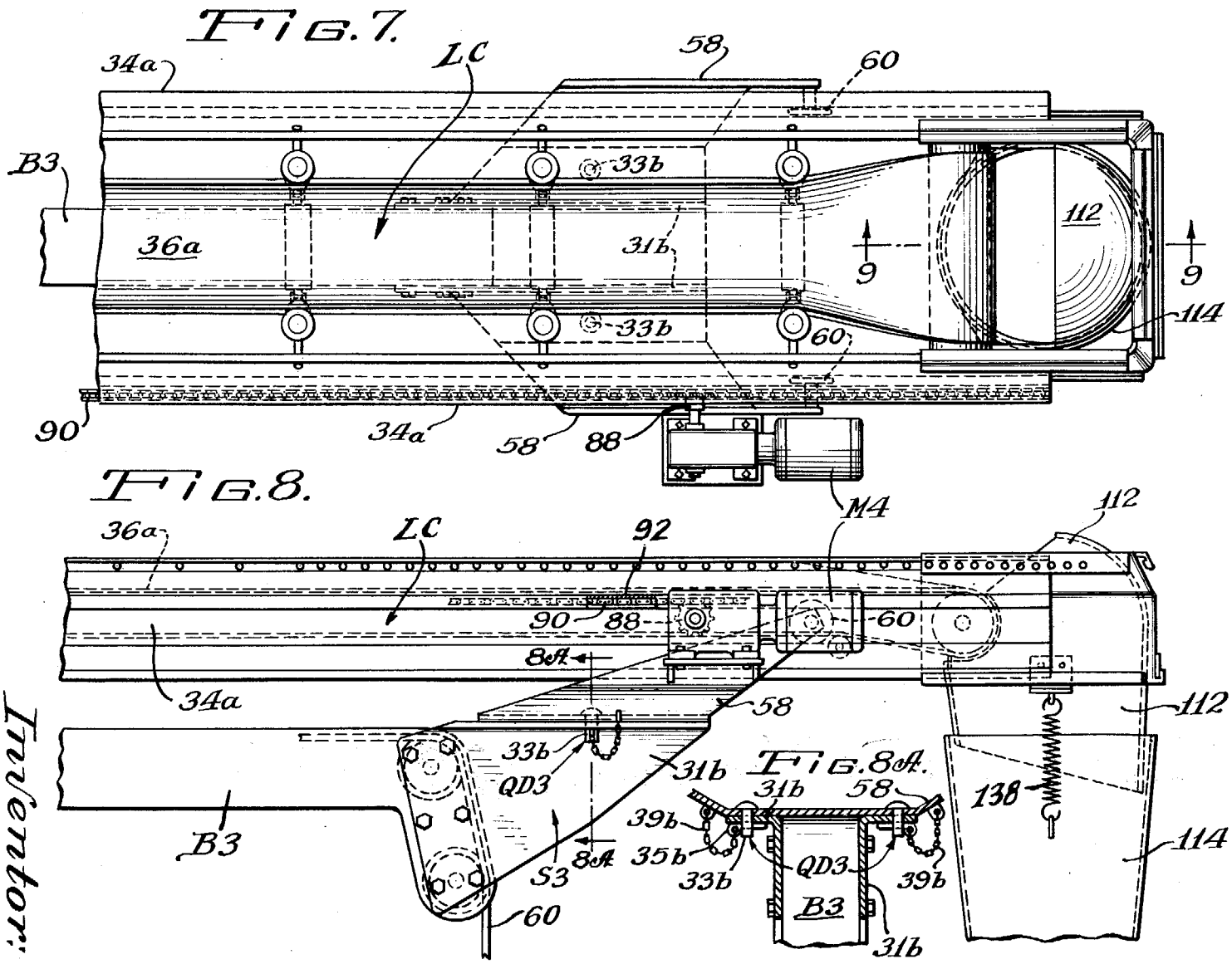
Inventor:
Robert F. Oury
By Bair, Freeman & Molinare Attys.

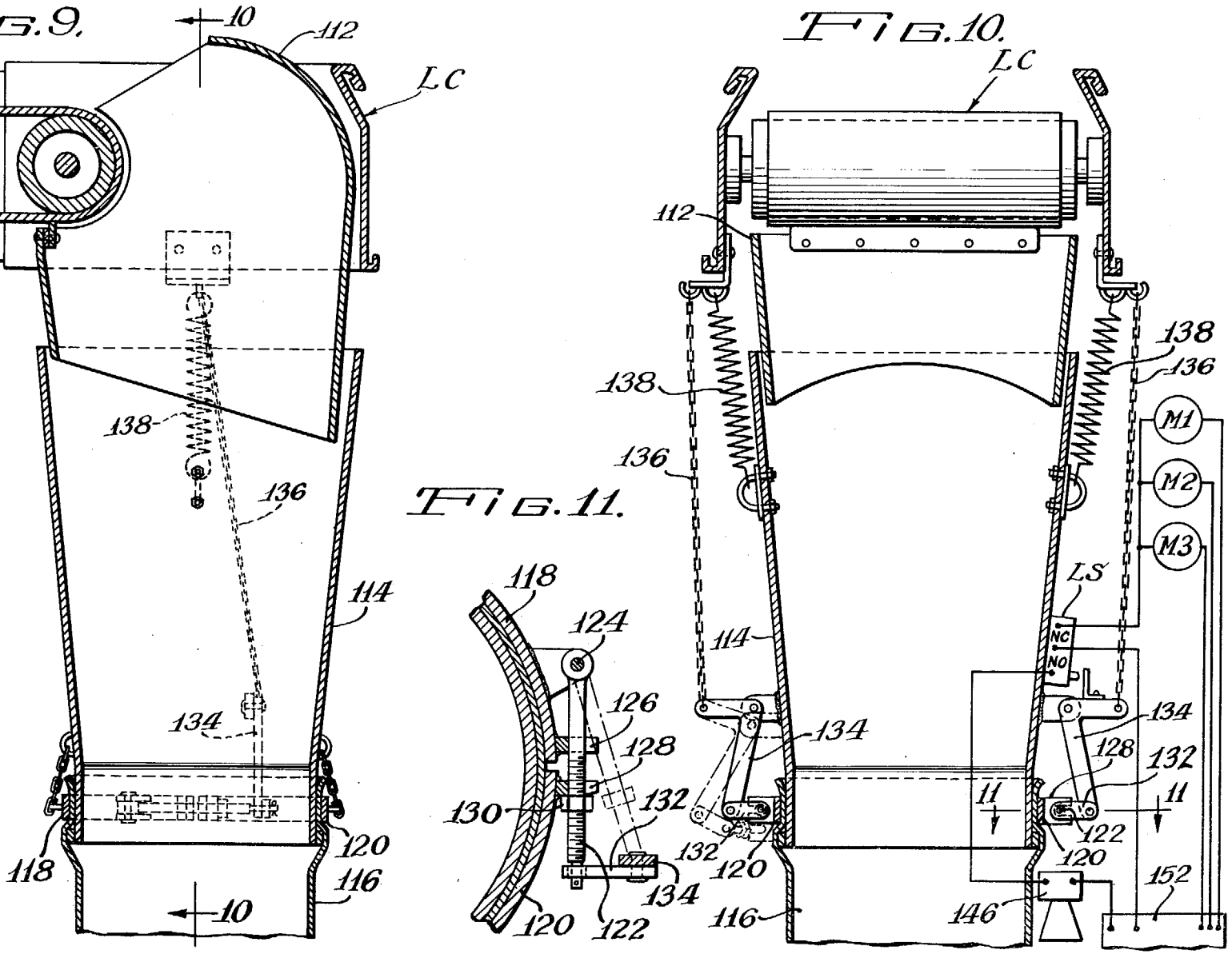
Inventor:
Robert F. Oury
By Bair, Freeman & Molinare Attys.

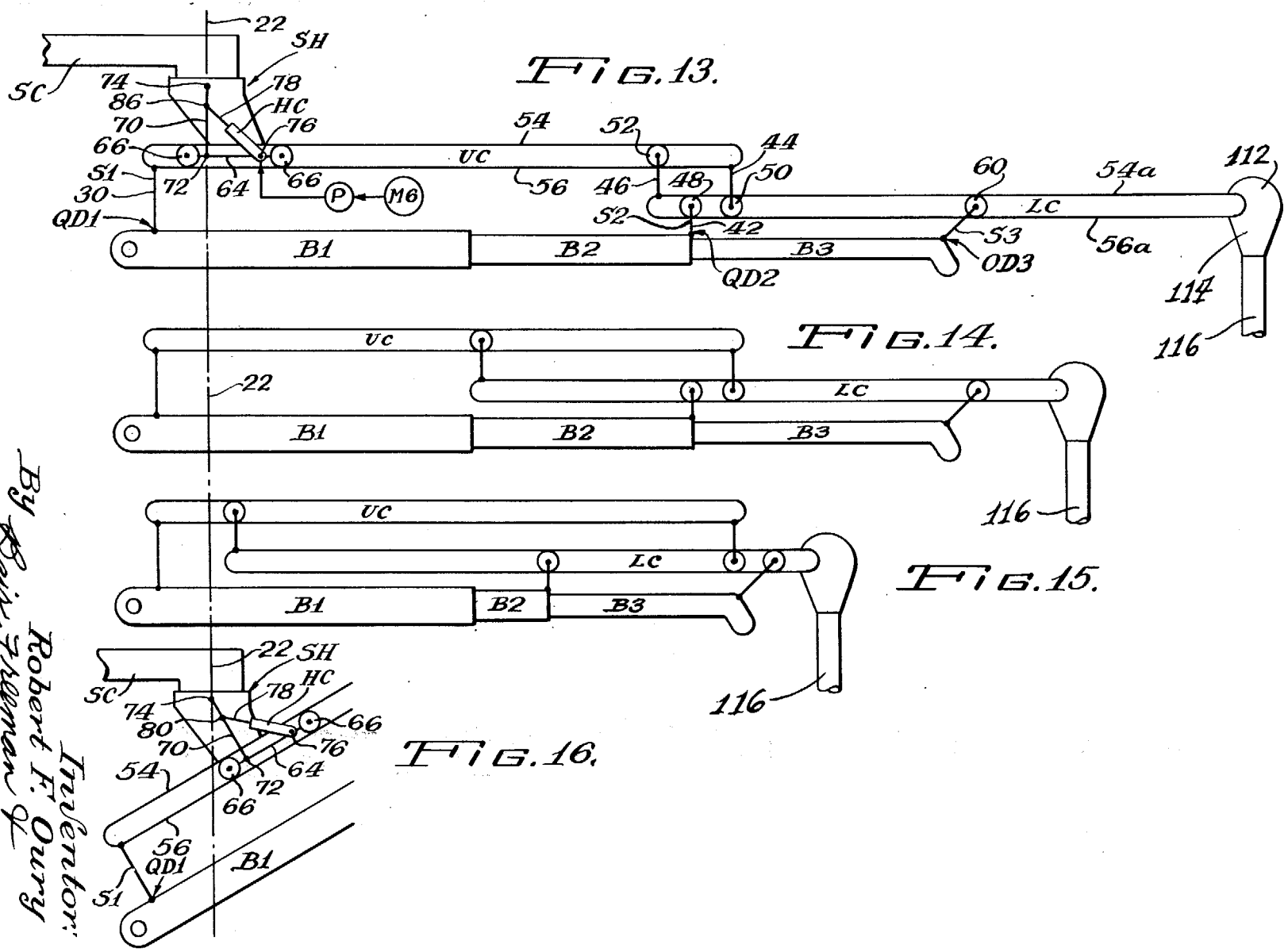
Inventor:
Robert F. Oury
By Bair, Freeman & Molinare Attys.

BOOM MOUNTED CONVEYING MEANS

Matter enclosed in heavy brackets [ ] appears in the original patent but forms no part of this reissue specification; matter printed in italics indicates the additions made by reissue.

BACKGROUND OF THE INVENTION

Various conveyor arrangements have been provided for the purpose of placing granular or plastic materials, and concrete or the like, such as disclosed in prior Oury U.S. Pat. Nos. 3,151,732, 3,171,534 and 3,203,538. Another conveyor arrangement is shown in my copending application, Ser. No. 735,004, filed June 6, 1968. The presently disclosed conveyor system is particularly adapted for mounting on a wheeled vehicle having an extensible boom which can also be elevated and swung from side to side, and the boom carries part of the conveyor system so that the discharge end of the system can be adjusted by the operator of the vehicle to follow a wall form or the like, and elevated as the materials accumulate without interrupting the continuous flow of concrete from a delivery vehicle to the conveyor system and from the conveyor system to various positions of deposit.

One object of the invention therefore is to provide a design of conveyor system in which a lower conveyor is telescopically related to an upper conveyor and manipulated by the extensible boom, both conveyors being mounted on the boom and a supply conveyor being related to the upper conveyor so as to supply materials thereto continuously without interruption while the lower conveyor is being extended or retracted, and while the boom is being raised or lowered.

Another object is to provide a lower conveyor so mounted on an extensible boom that it can be extended and retracted with the boom, and additionally extended and retracted relative to the boom for maximum range of discharge end positioning.

Still another object is to provide a supply conveyor which is mounted on castered wheels and discharges into a swivel hopper, which in turn discharges onto the upper conveyor of the system, the caster wheels permitting positioning of the wheeled vehicle and thereafter swinging of the supply hopper to a suitable position for receiving materials from a supply vehicle.

A further object is to provide means for locking the caster wheels against castering so that the wheeled vehicle can be driven from one place to another with the supply hopper trailing behind it, the caster wheels being then unlocked for swinging the supply hopper to any suitable position for receiving materials.

Still a further object is to provide a swivel hopper mounted in alignment with the vertical axis on which the extensible boom swings, and an arrangement for readjusting the swivel hopper to align with that axis following a change in inclination of the extensible boom and the conveyors carried thereby.

An additional object is to provide supporting means for the upper and lower conveyors on the extensible boom so arranged as to permit various adjustments of the upper and lower conveyors in relation to each other and counteract cantilever action of the lower conveyor by properly adjusting the supporting means by extension or retraction of the extensible boom.

Another additional object is to provide track and roller connections between the upper and lower conveyors and between the extensible portions of the boom and the conveyors to permit the various desired extensible and retractable adjustments of the upper and lower conveyors in relation to each other.

Still another additional object is to provide quickly disconnectable connections between the conveyor system and the extensible boom of the wheeled vehicle so that the conveyor system can be removed by another crane or the like, and the wheeled vehicle and its extensible boom thereupon used in its normal capacity as a crane.

A further additional object is to provide automatic release means for a tremie at the outer discharge end of the lower conveyor so that upon the tremie becoming overloaded such release can occur.

Still a further additional object is to provide signal means and a circuit for stopping the conveyor system operable prior to automatic release of the tremie.

BRIEF SUMMARY OF THE INVENTION

Upper and lower conveyors are mounted on an extensible boom of a wheeled vehicle, and a supply conveyor is associated with the upper conveyor in such manner as to receive concrete or the like from a delivery vehicle and deliver it through a swivel hopper to the upper conveyor. The extensible boom and the system of upper and lower conveyors can be extended, and/or elevated, and/or rotated for adjusting the discharge end of the lower conveyor to a wall form or the like wherein the concrete is placed, all without interference with the continuous supply of concrete to the supply conveyor. A warning and automatic release system is provided for a tremie at the discharge end of the lower conveyor.

BRIEF DESCRIPTION OF THE DRAWINGS

FIG. 7 is a plan view of the outer end of the lower conveyor, and is a continuation of the right-hand end of FIG. 4;

FIG. 8 is a side elevation of FIG. 7 and is a continuation of the right-hand end of FIG. 5;

FIG. 8A is an enlarged vertical cross section on the line 8A—8A of FIG. 8;

FIG. 9 is an enlarged vertical cross section on the line 9—9 of FIG. 7;

FIG. 10 is a vertical sectional view on the line 10—10 of FIG. 9 and includes an electric circuit diagram for an overload condition and automatic stopping means for my conveyor system;

FIG. 11 is a further enlarged horizontal cross section on the line 11—11 of FIG. 10;

FIG. 13 is a diagrammatic view of my upper and lower conveyors and the swivel hopper associated with the upper conveyor, all mounted on an extensible boom of a wheeled vehicle, and illustrates full extension of the conveyor arrangement;

FIG. 14 is a similar diagrammatic view showing intermediate extension;

FIG. 15 is a similar diagrammatic view showing minimum extension thereof; and

FIG. 16 is a diagrammatic view similar to the left-hand end of FIG. 13 showing an angular position of the boom and a readjusted position of a swivel hopper of any conveying means.

DESCRIPTION OF THE PREFERRED EMBODIMENT

Figures 1, 12:
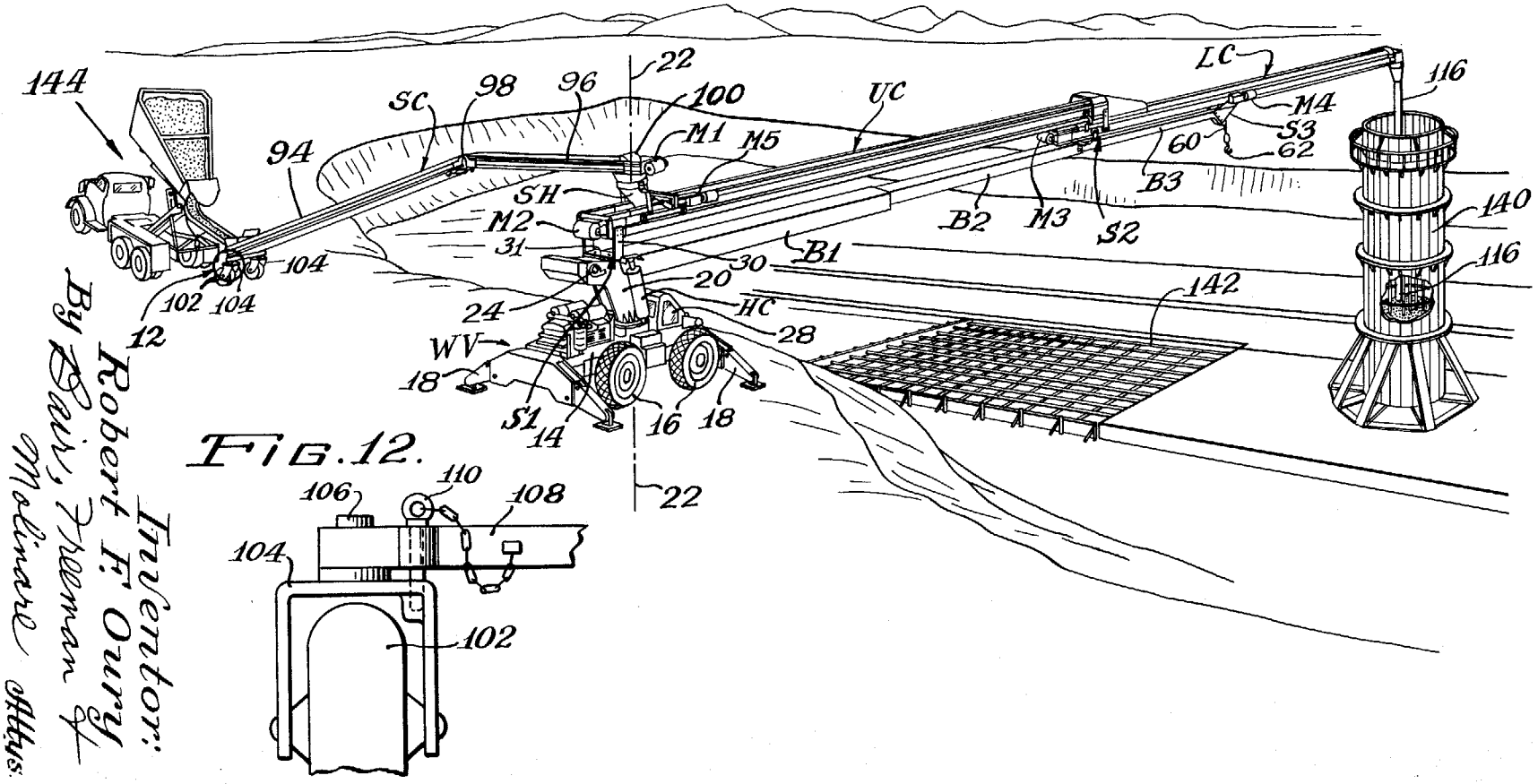
FIG. 1 is a perspective view of my boom mounted conveying means showing it mounted on an extensible boom of a wheeled vehicle, and illustrating a dump truck delivering materials thereto, such materials being conveyed to a column form.
FIG. 12 (on Sheet 1) is an elevational detail of a portion of FIG. 1 within the circle 12 thereof.

On the accompanying drawings I have used the following reference characters to indicate the major elements of my invention, reserving reference numerals for the description of details of those elements:

B1—a First Boom Section of a Wheeled Vehicle
B2 and B3—Second and Third Boom Sections
HC—Hydraulic Cylinder
LC—Lower Conveyor
LS—Limited Switch for M1, M2, M3 and Siren 146
M1—Motor for Supply Conveyor SC (omitted from FIG. 3)
M2—Motor for Upper Conveyor UC
M3—Motor for Lower Conveyor LC
M4—Motor for telescoping the Lower Conveyor LC
M5—Motor for traversing the Swivel Hopper SH along Upper Conveyor UC
M6—Motor for driving Pump P
P—Pump to actuate Hydraulic Cylinder HC
QD1—Quick Disconnect means for Support S1
QD2—Quick Disconnect means for Supporting means S2
QD3—Quick Disconnect Means for Support S3
S1—Support (on inner end of Boom B1) for inner end of Upper Conveyor UC
S2—Supporting means (on outer end of Boom B2) for outer end of Upper Conveyor UC and for Lower Conveyor LC
S3—Support (on outer end of boom B3) for Lower Conveyor LC
SC—Supply Conveyor
SH—Swivel Hopper
UC—Upper Conveyor
WV—Wheeled Vehicle Describing now the details of the foregoing elements, and starting with the wheeled vehicle WV shown in FIG. 1, this may be one of the present-day types of hydraulically powered telescopic boom cranes comprising a body 14 provided with the usual four wheels 16 and with outriggers 18 for stability. A boom supporting column 20 is rotatable on a vertical axis 22 (see FIGS. 1, 2 and 13–6) and the boom section B1 is pivoted thereto at 24 for change of angle as from the horizontal position shown in FIGS. 1 and 2 to any desired elevated angular position. Such angular elevation is effected by the hydraulic cylinder HC. A driver's cab 28 is mounted on the frame 14 in which there are suitable controls (including a control panel 152—see FIG. 10) for rotation of the boom supporting column 20 and telescoping of the boom B1, B2, B3, as well as elevation of the boom and other driving controls of well known nature and which accordingly I neither disclose nor describe.

Figures 2, 2A, 3:
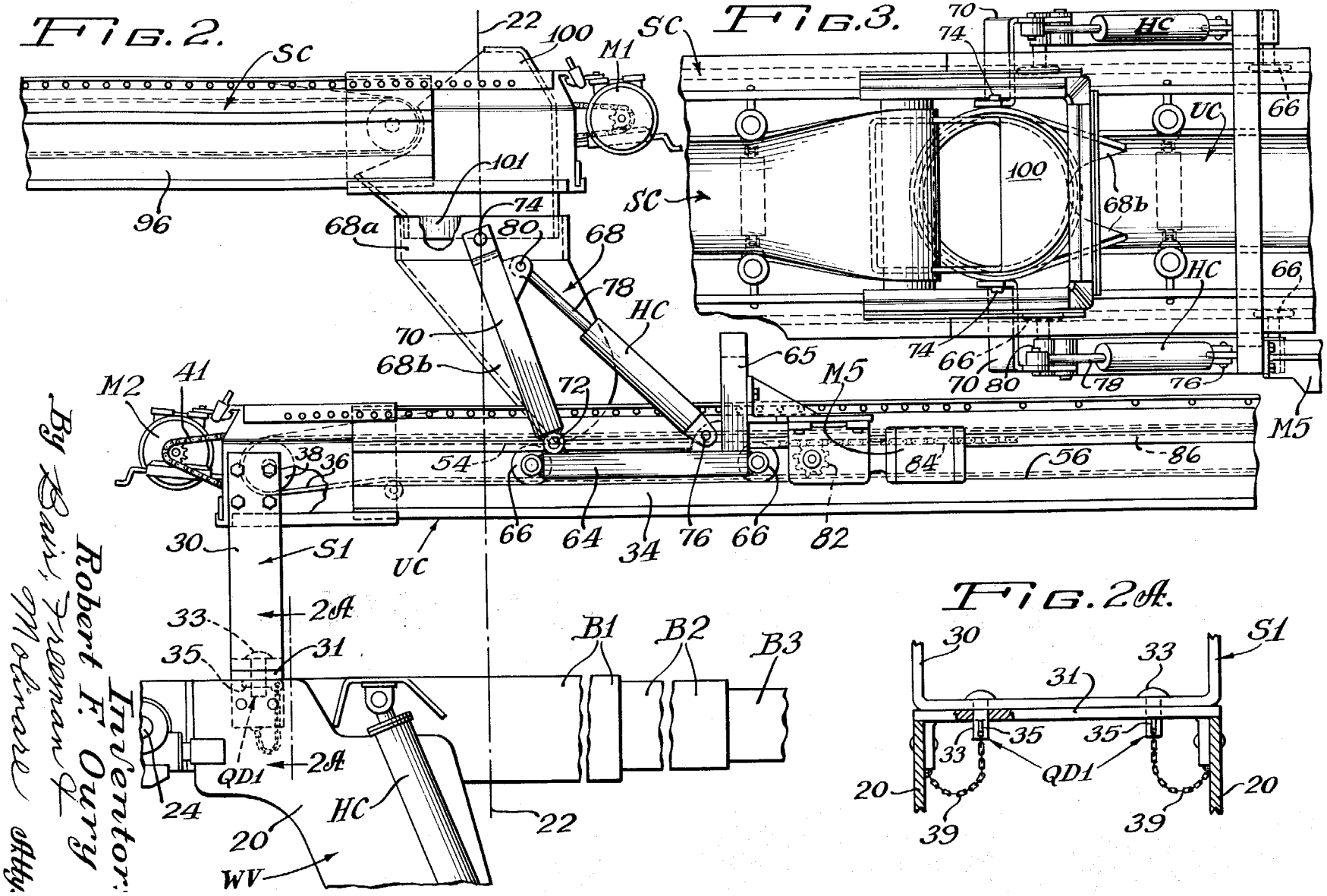
FIG. 2 is an enlarged side elevation of the central portion of FIG. 1.
FIG. 2A is an enlarged vertical sectional view on the line 2A—2A of FIG. 2.
FIG. 3 is a plan view of a portion of FIG. 2.

I provide conveying means for concrete or the like comprising the conveyors SC, UC and LC mounted on the boom B1, B2, B3 in a manner which will now be described. Referring to FIG. 2, the support S1 comprises a yoke 30 secured by a quick disconnect means QD1 to the column 20 as shown in FIG. 2A. By way of example, a platform 31 is secured to the column 20 and is perforated to receive studs 33 welded to the horizontal crossmember of the yoke 30, removable pins 35 being provided and secured by chains 39 to the platform 31 to prevent their loss. The upper ends of the arms of the yoke 30 are attached to the inner end of a frame 34 of the upper conveyor UC. The upper conveyor frame 34 is actually a pair of side frames (see FIG. 6), preferably of the extrusion type shown in FIGS. 7 and 11 of my copending application hereinbefore referred to.

Figures 4, 5:
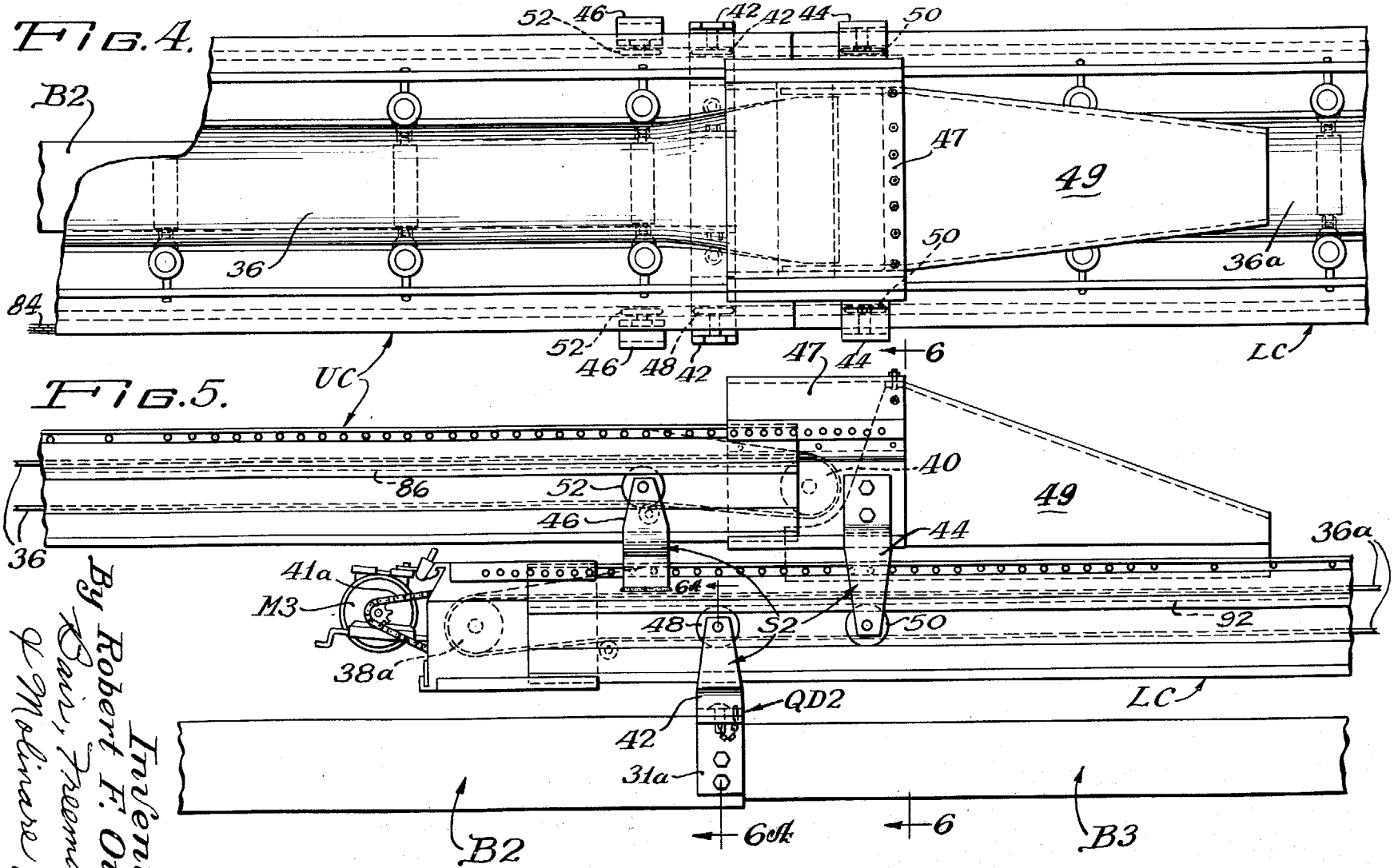
FIG. 4 is a plan view of the central portion of my conveyor arrangement, being the outer end of the upper conveyor and the inner end of the lower conveyor, and being a continuation of the right-hand end of FIG. 3.
FIG. 5 is a side elevation of FIG. 4 and is a continuation of the right-hand end of FIG. 2.

A conveyor belt 36 is trained around rollers 38 and 40 as shown in FIGS. 2 and 5 respectively, and FIG. 2 shows the motor M2 for driving the roller 38 by means of a chain connection 41, this type of drive being also shown in my copending application.

The conveyor belts 36 and 36a (see FIG. 6) are suitably troughed by means of idler rollers 37 and 37a (as also shown in my copending application). A transfer hood 49 of rubber or the like mounted on a bracket 47 directs conveyed materials from the discharge end of the upper conveyor UC to the lower conveyor LC (see also FIGS. 4 and 5).

Figures 6, 6A:
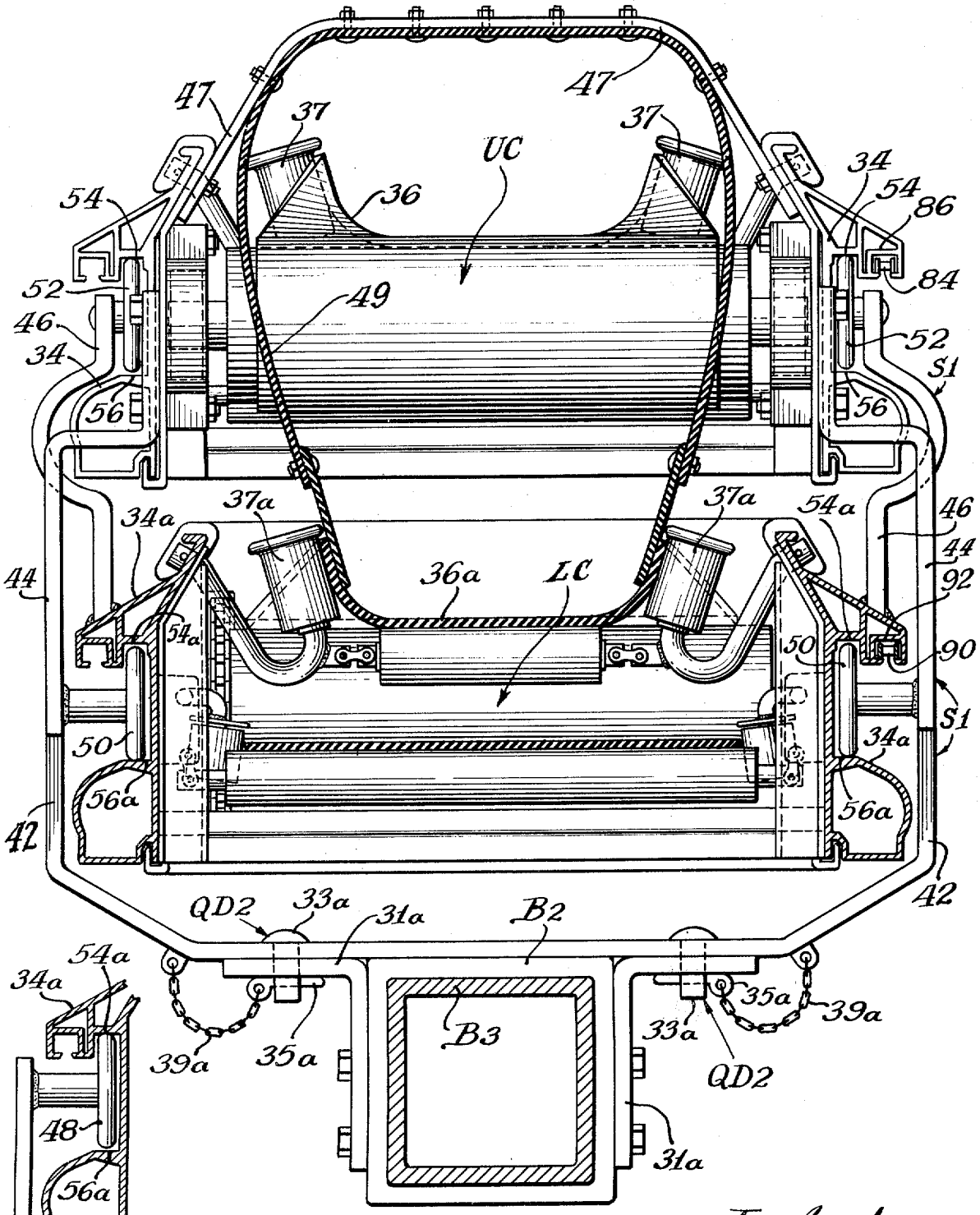
FIG. 6 is an enlarged vertical cross-sectional view on the line 6—6 of FIG. 5.
FIG. 6A is a detail vertical sectional view on the line 6A—6A of FIG. 5.

The support S2 is of special three-part design comprising three brackets 42, 44 and 46 for each side of the upper and lower conveyors UC and LC as shown in FIGS. 4 and 5. The brackets 42 are the arms of a yoke secured to the outer end of the boom section B2 and terminate at their upper ends in wheels 48. The quick disconnect means QD2 for the bracket 42 as illustrated in FIG. 6 for connecting the bracket in quick disconnect manner to the boom B2. The quick disconnect means QD2 is similar to QD1 shown in FIG. 2A and is illustrated in FIG. 6, certain parts being substantially the same as in FIG. 2 and bearing the same reference numerals with the addition of the distinguishing characteristic a(31a, 33a, 35a and 39a).

The brackets 44 are secured at their upper ends to the outer end of the upper conveyor UC and terminate at their lower ends in wheels 50. Conversely the brackets 46 are secured, as by welding at their lower ends, to the inner end of the lower conveyor LC and terminate at their upper ends in wheels 52. The wheels 52 travel in tracks of the frame 34 of the upper conveyor UC, which are identified (upper and lower surfaces thereof) as 54 and 56 in FIG. 6.

Similarly, as shown in FIG. 6, the lower conveyor is provided with side frames 34a which have tracks 54a, 56a in which the wheels 48 and 50 travel. The triple bracket arrangement 42, 44, 46 of the support S2 is provided to accommodate the three-section telescoping boom B1, B2, B3 of the wheeled vehicle WV and stabilize the inner end of the lower conveyor LC by counteracting cantilever action thereof as will hereinafter appear. The lower conveyor LC is similar, as far as conveyor belt, roller and drive motor are concerned, to the upper conveyor UC, having a belt 36a, rollers 38a and 40a and a drive chain 41a actuated in this case by the motor M3.

The support S3 as shown in FIGS. 7, 8 and 8A comprises a yoke 58 secured to the outer end of the boom section B3 and includes the quick disconnect means QD3. The quick disconnect means QD3 is similar to those already described and comprises comparable elements identified 31b, 33b, 35b and 39b. The upper ends of the yoke 58 terminate in wheels 60 also coacting with the tracks 54a, 56a of a side frame 34a of the lower conveyor LC.

FIG. 8 also shows the usual crane cable 60 while FIG. 1 shows it and the hook 62 on the lower end thereof for use of the crane in its normal capacity when used alone, as when my boom mounted conveying means has been demounted therefrom. The cable and hook can also be used while the conveyors are mounted on the boom.

The swivel hopper SH shown in FIGS. 1, 2 and 3 is mounted on a frame comprising a pair of side members 64 and a cross-member 65 and provided with four wheels 66, tow for travel in each of the tracks 54, 56 of the side frames 34 of the upper conveyor UC. The swivel hopper includes a chute 68 having an annular or cylindrical upper portion 68a and a lower discharge portion 68b as clearly shown in FIGS. 2 and 3 for receiving materials from the supply conveyor SC and discharging them onto the upper conveyor UC. The cylindrical portion 68b is supported by a pair of links 70 having lower pivots 72 to the side frames 64 and upper pivots 74 to the cylindrical portion. Means is provided for adjusting the relative positions of the frame 64, 65 and the chute 68 longitudinally of the upper conveyor UC comprising two of the hydraulic cylinders HC (one for each of the two links 70) which are pivoted at 76 to the frame 64 and have piston rods 78 extending therefrom and pivoted at their upper ends at 80 to the links 70. By reference to the vertical axis 22 of the column 20 in FIG. 2 hereinbefore referred to, it will be noted that the center of the cylindrical portion of the chute 68 is coincident with this axis. Both the position of the frame 64, 65 along the tracks 54, 56, and the angularity of the links 70 for movement to the right or the left of the axis 22 can be adjusted. Accordingly, when the angle of elevation of the boom B1, B2, B3 is changed and throws the axis of the swivel hopper SH off with relation to the vertical axis 22 from the position illustrated in FIG. 2, adjustments can be made to bring the axis of the swivel hopper back into coincidence with the axis 22 as in FIG. 16 so that the boom B1, B2, B3 may be swung about the axis 22 without disturbing the position of the swivel hopper and the supply conveyor SC connected therewith. This permits uninterrupted delivery of materials from the supply conveyor SC onto the upper conveyor UC even though the outer end of the boom is pivoted from side to side for distributing concrete along a dam site or along a wall form or the like, and at the same time the extensible boom can be extended for following any straight line (or any curved line) of discharge required. All of these features contribute to a high rate of material delivery without interruption due to required stopping and repositioning of conveyors as in prior conveyor systems.

Controllable means to traverse the frame 64, 65 of the swivel hopper SH along the upper conveyor UC comprises the motor M4 (FIG. 2) on the frame, and suitable stepdown gearing terminating in a sprocket 82 meshing with a chain 84 and located in a channel 86 of the right side frame 34 shown in FIG. 6. Similarly the motor M4 for traversing the lower conveyor LC relative to the upper conveyor UC drives a sprocket 88 through suitable stepdown gearing meshing with a chain 90 contained in a channel 92 of the right side frame 34a. The ends of the chains 84 and 90 are secured to the upper and lower conveyors respectively adjacent their ends whereby rotation of the sprockets 82 and 88 result in their travel along the chains in either desired direction, the motors M5 and M4 being of reversible type for this purpose.

The supply conveyor SC has a lower and upper portions 94 and 96 which are jointed together in any suitable manner as indicated at 98 in FIG. 1 so that the upper portion 96 may be levelized or adjusted to a position at right angles to the axis 22 as shown in FIGS. 1 and 2. The outriggers 18 can of course be operated to attain true vertical for the axis 22. The terminal end of the conveyor SC is provided with a discharge head 100 to which it is secured, and the head has an annular lower portion 101 to fit inside the cylindrical upper portion 68a of the chute 68 for relative rotation about the axis of the annular and cylindrical portions just mentioned. On the lower end of the lower portion 94 of the supply conveyor SC caster wheels 102 are mounted as shown in FIGS. 1 and 12, the caster yokes therefor being shown at 104 pivoted as at 106 to a cross frame member 108. Normally the wheels 102 are free to caster, but may be locked as by lockpins 110 for transport as will hereinafter be described.

The outer end of the lower conveyor LC carries a discharge boot 112 discharging into a funnel 114 to which a tremie 116 is secured. The manner of securement is releasable, and may comprise by way of example a clamp band formed of two halves 118 and 120 normally held together by release links 122 which may be in the form of threaded rods pivoted at 124 to the clamp band half 118 and extending other type slots U-shaped ears 126 and 128 on the band halves 118 and 120 respectively as shown in FIG. 11. Connecting links 132 are loosely pivoted to the outer ends of the release links 122 and are pivoted to bellcranks 134 connected by chains 136 to the frame of the lower conveyor LC. The tremie 116 may be formed of a plastic tube for material delivery purposes and used as shown, for instance in FIG. 1 to fill a column form 140, a floor form as at 142, a wall form (not illustrated), or a dam wall form or the like. FIG. 1 also illustrates a dump truck 144 delivering materials to the supply conveyor SC.

The funnel 114 is suspended by a pair of springs 138 from the lower conveyor LC and together with the chains 136, bellcranks 134, links 132 and release links 122, an automatic release means for the tremie 116 is provided in response to excessive loading thereof as will hereinafter appear.

Before the tremie 116 releases however, a limit switch LS shown diagrammatically in FIG. 10 is actuated for the purpose of closing a circuit through an adjacently located waring siren 146 and opening the circuit of all three conveyor motors M1, M2 and M3. Thus the siren (or other type of warning device) alerts the men below the conveyor and guiding the tremie for distributing the concrete, that an overload condition is imminent and the tremie may release. At the same time the entire conveyor is automatically shut down, quite often before actual release of the tremie occurs. Accordingly the men can relieve the overload condition and recondition the tremie release for proper automatic operation again. FIG. 10 also shows, in simplified diagrammatic form, part of the control panel 152 in the cab of the vehicle WV to show two terminals at the left for current supply to the siren 146 and the motors M1, M2 and M3, and three terminals to the right for the individual controls for the motors M1, M2 and M3 by the operator in the cab. Since electric circuitry is well known in the art but forms no part of my present invention, I have not illustrated the details of a type of circuit suitable for the signal devices and motors such as disclosed in FIG. 10.

PRACTICAL OPERATION

In the operation of my boom mounted conveying means, the extensible boom of the wheeled vehicle WV and the lower conveyor LC may be retracted to the position shown in FIG. 15 for transport of the vehicle, and the lockpins 110 may be inserted for locking the castered wheels 102 against castering whereupon the vehicle may be used to transport the entire conveyor system from one location to another, the wheels 102 trailing behind the vehicle wheels 16 in an obvious manner.

At the new job location the outriggers 18 can be extended and adjusted for verticalizing the column centerline 22 whereupon the boom and lower conveyor can be extended as desired, the lockpins 110 removed and the lower end of the supply conveyor SC swung around to any convenient location for receiving materials from the dump truck 144. The joint at 98 between the lower and upper portions 94 and 96 of the supply conveyor can be adjusted for levelizing the upper portion 96 to permit positioning the lower reception end of the supply conveyor without binding action during the swiveling of the connection between the supply conveyor and the swivel hopper SH. The motors M5 and M6 are actuated for aligning the axis of the conveyor and hopper parts 101 and 68a with the axis 22.

Materials may now flow from the dump truck 144 onto the supply conveyor SC and will be delivered to the upper conveyor UC and it will deliver the materials to the lower conveyor LC for discharge through the tremie 116 as into the column form 140 shown in FIG. 1. As the materials accumulate in the form the extensible boom B1, B2, B3 may be elevated and the motors M5 and M6 suitably actuated to retain the axis of the swivelly related parts 101 and 68a aligned with the axis 22.

When a horizontally elongated form is to be filled with concrete such as a wall form or the like, the boom can be swung from side to side, and the boom and lower conveyor retracted or extended as required to properly discharge into the form from one end thereof to the other, then elevated for discharge along the form in the opposite direction, all while the concrete is being continuously supplied and discharged at the high speeds disclosed in the above mentioned Oury patents. Accordingly, my boom mounted conveyor system makes possible the placement of a complete load from the supply truck without interruption, thus saving valuable time in the operation of form filling or comparable operations such as the placement of granular material and the like.

By the use of a novel supporting system such as I disclose for the conveyors with respect to the extensible boom, a maximum range of adjustment is had, together with proper distribution of supporting means to counteract cantilever action. By the use of the three quick disconnect means disclosed, a minimum of time is involved in removing the conveyor system from the wheeled vehicle whereupon it can than be used between conveyor operations as a crane in its normal capacity.

I claim as my invention:

1. Apparatus for conveying concrete, said apparatus comprising a crane-type vehicle having a boom-supporting column with a substantially vertical axis, a load-supporting cantilever boom mounted on said column and having first and second portions, said first boom portion being mounted for rotation and angular elevation with respect to said vehicle axis, said second boom portion being extensively carried by said first boom portion, endless-belt conveyor means having a fixed section and a moving section wholly supported by said boom, first, second and third support means cooperating to support said conveyor means on said boom, and quick disconnect means provided for said first, second and third supporting means so that said conveyor means is readily connected to or disconnected from said boom.

2. Means for conveying concrete comprising:

a crane-type wheeled vehicle;

an extensible, load supporting, cantilever boom pivotally mounted for rotation and angular elevation on said vehicle and comprising telescoping sections;

extensible outrigger means mounted on said vehicle for stability when the boom is in operation;

a first conveyor mounted on said boom;

a second conveyor mounted on said boom above the boom and beneath said first conveyor, said second conveyor being longitudinally movable with one telescoping section and having its inner end disposed with respect to the outer end of said first conveyor to receive concrete therefrom;

each of said conveyors being wholly supported by said boom and comprising a frame with an endless belt mounted thereon;

a first support extending upwardly from said boom for the inner end of said first conveyor;

a second support on-said boom spaced outwardly from said first support for at least partially supporting the outer end of said first conveyor;

a third support for said second conveyor mounted on a movable telescoping section of said boom;

additional support means including track and roller means extending between the frames of said first and second conveyors to further support said second conveyor by suspension from said first conveyor and to permit said longitudinal movement of said second conveyor with respect to said first conveyor;

hopper means mounted on and above said first conveyor; and a supply conveyor associated with said first conveyor for delivering concrete into said hopper means.

3. Means for conveying concrete in accordance with claim 2 wherein said boom has a nonextensible portion, and first and second movable telescoping sections, said first support being positioned adjacent the inner end of said nonextensible boom portion and the inner end of said first conveyor and connecting them together, said second support comprising three supporting elements, a first supporting element at the outer end of said first extensible boom portion and coacting with the track means of said second conveyor, and the second and third ones positioned inwardly and outwardly of said first supporting element, one of said second and third ones having coaction with the tracks means of said first conveyor and the other thereof having coaction with the track means of said second conveyor, and said third support being located at the outer end of said second telescoping section and having coaction with the track means of said second conveyor.

4. Means for conveying concrete in accordance with claim 3 wherein each of said first, second and thrd supports has [quickly] *quick* disconnect means for said conveying means with respect to said nonextensible and telescoping sections of said boom.

5. Means for conveying concrete in accordance with claim 2 wherein said supply conveyor has an intake end adjacent ground level, and an elevated discharge end at said hopper means.

6. Means for conveying concrete in accordance with claim 5 wherein the lower intake end of said supply conveyor is provided with caster wheels for transport of said concrete conveyor by operation of said wheeled vehicle.

7. Means for conveying concrete in accordance with claim 6 wherein means is provided for locking said caster wheels against castering during such transport.

8. Means for conveying concrete in accordance with claim 2 wherein each of said first, second and third supports has a quickly disconnectable connection with said boom.

9. Means for conveying concrete comprising:

a crane-type wheeled vehicle having outriggers;

an extensible load-supporting, cantilever boom pivotally mounted for rotation and angular elevation on said vehicle and comprising telescoping sections;

a first belt conveyor mounted on and above said boom;

a second belt conveyor, spaced intermediate said boom and said first conveyor, supported for longitudinal movement by supports extending upwardly from the extensible telescoping sections of said boom and downwardly from said first conveyor, said second conveyor being coupled to one of said extensible telescoping sections to move therewith;

a hopper mounted on and above said first conveyor;

a supply conveyor having its discharge end disposed above said hopper and its intake end adjacent ground level; and funnel means at the discharge end of said second conveyor for directing the flow of concrete from the conveyor.

10. Means for conveying concrete in accordance with claim 9 wherein said hopper is pivotally mounted for maintaining a vertical attitude independently of the angle of elevation of the boom and the first conveyor on which the hopper is mounted.

11. Means for conveying concrete in accordance with claim 10 wherein said hopper mounting carries rollers for longitudinal movement of said hopper along said first conveyor.

12. Means for conveying concrete in accordance with claim 10 wherein said hopper pivotal mounting includes a carriage support, wheels for the carriage and a track extending longitudinally of said first conveyor on which said wheels ride.

13. Means for conveying concrete in accordance with claim 9 wherein a tremie extends downwardly from said funnel and supporting means is provided for said tremie which releases the tremie in response to an accumulation of concrete in said tremie reaching a predetermined weight.

14. The concrete conveyor of claim 9 in which the telescoping boom sections have smooth platelike external surfaces.

*15. A self-propelled crane having an extendable boom and an extendable conveyor system, comprising in combination:*

*a. a self-propelled crane having a main boom and at least one extendable boom extendable and retractable parallel to said main boom;*

*b. a main conveyor connected in spaced relationship above said main boom, said main conveyor having a flexible endless belt driven by at least one motor;*

*c. a feed conveyor movably attached to said main conveyor at one end thereof and adapted to convey materials from a loading point onto said main conveyor, said feed conveyor having an endless conveyor belt;*

*d. an extension conveyor connected at one end to an extendable and retractable boom, and said extension conveyor having a flexible endless belt driven by at least one motor;*

*e. said main conveyor being spaced above said main boom sufficiently to allow said extension conveyor to move between said main boom and said main conveyor during extension and retraction of said extension conveyor by said extendable and retractable boom extending and retracting; whereby materials are adapted to be placed over an area defined by the extension and retraction of said extension conveyor;*

*f. said feed conveyor being adapted to discharge materials onto said main conveyor and said main conveyor being adapted to discharge materials onto said extension conveyor and said extension conveyor being adapted to discharge said materials from said conveyor apparatus; and*

*g. said crane boom being rotatable for rotating said main conveyor on said vehicle for extending the area of placement of materials by said apparatus.*

*16. The apparatus in accordance with claim 15 in which said feed conveyor is adapted to be placed on top of said main conveyor for transportation between locations, said feed conveyor being movably attached to said main conveyor by wheels riding in channels on said main conveyor.*

*17. The apparatus according to claim 16 in which each said extension conveyor is adapted to be retracted between said main boom and said main conveyor for transportation between locations, and said extension conveyor having a pair of channels riding on wheels, said wheels being rotatably connected to wheel supports attached to said extension boom.*

*18. The apparatus according to claim 17 in which said extendable boom has two telescoping elements telescoping into and out of said main boom and one said telescoping element telescoping into the other intermediate telescoping boom element and the main boom having one end of the main conveyor attached thereto with the other end riding on wheels in channels on said extension conveyor and said extension conveyor having its wheel support attached to said intermediate boom element and said extension conveyor being attached to said one telescoping element.*

*19. The apparatus according to claim 15 in which said feed conveyor has a flexible joint located between the ends thereof.*

*20. A self-propelled apparatus for conveying concrete having a load supporting, cantilevered boom and an extendable telescoping conveyor system mounted above and wholly supported by said boom comprising in combination:*

*a. a self-propelled crane having positioned thereon a load supporting, cantilevered boom, said boom adapted to rotate, elevate and telescope relative to a vertical axis and having a fixed section and at least one extendable section extendable and retractable relative to the fixed section;*

*b. a top conveyor positioned in spaced relationship above the fixed section of the boom;*

*c. means for supporting said top conveyor above said fixed section of the boom;*

*d. a bottom conveyor positioned above the extendable and retractable section of the boom;*

*e. means for supporting siad bottom conveyor above said extendable and retractable section of the boom;*

*f. said top conveyor being spaced above said fixed boom section a distance sufficient to permit said bottom conveyor to move between the fixed boom section and said top conveyor during extension and retraction of said bottom conveyor whereby concrete can be discharged from the top conveyor onto the bottom conveyor over an area defined by the extension and retraction of said bottom conveyor below said top conveyor;*

*g. a feed conveyor having a discharge end, said discharge end pivotally connected to the top conveyor; and*

*h. said feed conveyor being adapted to convey materials from a loading point for discharge onto said top conveyor.*

* * * * *